United States Patent
Cao et al.

(10) Patent No.: US 9,906,083 B2
(45) Date of Patent: Feb. 27, 2018

(54) ROTORS WITH SEGMENTED MAGNET CONFIGURATIONS AND RELATED DYNAMOELECTRIC MACHINES AND COMPRESSORS

(71) Applicant: Emerson Electric Co., St. Louis, MO (US)

(72) Inventors: Pingshan Cao, Suzhou (CN); Xin Li, Suzhou (CN); Xin Li, Suzhou (CN)

(73) Assignee: EMERSON ELECTRIC CO., St. Louis, MO (US)

( * ) Notice: Subject to any disclaimer, the term of this patent is extended or adjusted under 35 U.S.C. 154(b) by 221 days.

(21) Appl. No.: 14/428,296

(22) PCT Filed: Sep. 29, 2012

(86) PCT No.: PCT/CN2012/001335
§ 371 (c)(1),
(2) Date: Mar. 13, 2015

(87) PCT Pub. No.: WO2014/047748
PCT Pub. Date: Apr. 3, 2014

(65) Prior Publication Data
US 2015/0270751 A1 Sep. 24, 2015

(51) Int. Cl.
*H02K 1/27* (2006.01)
*F04D 25/02* (2006.01)
(Continued)

(52) U.S. Cl.
CPC ......... *H02K 1/2773* (2013.01); *F04D 25/026* (2013.01); *F04D 25/06* (2013.01); *H02K 1/02* (2013.01)

(58) Field of Classification Search
CPC ........ H02K 1/27; H02K 1/276; H02K 1/2766; H02K 1/277; H02K 1/2773; H02K 21/024; H02K 21/12; H02K 21/14
(Continued)

(56) References Cited

U.S. PATENT DOCUMENTS 4,217,508 A  8/1980  Uzuka
4,875,110 A  10/1989 Kazama et al.
(Continued)

FOREIGN PATENT DOCUMENTS

CN  101507084 A  8/2009
CN  101640464    2/2010
(Continued)

*Primary Examiner* — Tran Nguyen
(74) *Attorney, Agent, or Firm* — Harness, Dickey & Pierce, P.L.C.

(57) ABSTRACT

A rotor for a dynamoelectric machine includes a rotor core having an outer periphery and at least a first set of magnets positioned within the outer periphery of the rotor core. The first set of magnets includes at least two block magnets and an arc magnet. The block magnets have a substantially parallel magnetization pattern and the arc magnet has a substantially radial magnetization pattern. The arc magnet has a concave surface facing the outer periphery of the rotor core. The first set of magnets defines a pole of the rotor. Rotors with other magnet configurations, and dynamoelectric machines and compressors incorporating such rotors, are also disclosed.

23 Claims, 7 Drawing Sheets

(51) Int. Cl.
*F04D 25/06* (2006.01)
*H02K 1/02* (2006.01)

(58) Field of Classification Search
USPC .................. 310/156.38, 156.39, 156.43, 310/156.48–156.57, 156.78
See application file for complete search history.

(56) References Cited

U.S. PATENT DOCUMENTS

| | | | |
|---|---|---|---|
| 5,384,506 A | 1/1995 | Aoshima | |
| 5,510,662 A * | 4/1996 | Tanimoto | H02K 21/14 310/156.53 |
| 5,548,167 A | 8/1996 | Belikov | |
| 5,945,760 A * | 8/1999 | Honda | H02K 1/276 310/156.53 |
| 5,962,944 A | 10/1999 | Narita et al. | |
| 6,025,667 A * | 2/2000 | Narita | H02K 1/2766 310/156.53 |
| 6,072,256 A * | 6/2000 | Shon | H02K 1/2766 29/598 |
| 6,177,745 B1 | 1/2001 | Narita et al. | |
| 6,211,593 B1 | 4/2001 | Nashiki | |
| 6,359,359 B1 | 3/2002 | Miura et al. | |
| 6,396,181 B1 | 5/2002 | Akemakou | |
| 6,664,688 B2 * | 12/2003 | Naito | H02K 1/278 310/156.01 |
| 6,713,909 B2 | 3/2004 | Money | |
| 6,849,981 B2 | 2/2005 | Kojima et al. | |
| 6,906,444 B2 * | 6/2005 | Hattori | H02K 1/2766 310/156.31 |
| 6,946,766 B2 | 9/2005 | Gary et al. | |
| 7,053,508 B2 | 5/2006 | Kusase et al. | |
| 7,411,329 B2 * | 8/2008 | Murakami | H02K 21/16 310/156.38 |
| 7,474,028 B2 * | 1/2009 | Shim | H02K 1/02 310/156.53 |
| 7,550,889 B2 | 6/2009 | Horst | |
| 7,598,645 B2 * | 10/2009 | Ley | H02K 1/276 310/156.38 |
| 7,808,143 B2 * | 10/2010 | Lee | H02K 1/2766 310/156.45 |
| 7,843,100 B2 | 11/2010 | Blissenbach et al. | |
| 7,932,658 B2 * | 4/2011 | Ionel | H02K 1/276 310/156.33 |
| 7,939,982 B2 * | 5/2011 | Horst | H02K 1/276 310/156.45 |
| 8,120,227 B2 | 2/2012 | Leroy et al. | |
| 8,432,080 B2 | 4/2013 | Murakami et al. | |
| 8,674,575 B2 | 3/2014 | Sakai et al. | |
| 2002/0036436 A1 * | 3/2002 | Koharagi | H02K 1/2766 310/156.53 |
| 2003/0011265 A1 * | 1/2003 | Hattori | H02K 1/2766 310/156.38 |
| 2005/0001504 A1 * | 1/2005 | Chang | H02K 1/276 310/156.53 |
| 2006/0061226 A1 | 3/2006 | Kim et al. | |
| 2006/0220485 A1 * | 10/2006 | Shim | H02K 1/02 310/156.45 |
| 2007/0126304 A1 * | 6/2007 | Ito | H02K 1/2766 310/156.53 |
| 2007/0159021 A1 | 7/2007 | Horst | |
| 2008/0224558 A1 * | 9/2008 | Ionel | H02K 1/2766 310/156.57 |
| 2008/0278021 A1 * | 11/2008 | Ley | H02K 1/2766 310/156.38 |
| 2010/0060223 A1 * | 3/2010 | Sakai | H02K 1/2766 318/494 |
| 2010/0171385 A1 * | 7/2010 | Sakai | H02K 1/2766 310/156.43 |

FOREIGN PATENT DOCUMENTS

| | | |
|---|---|---|
| CN | 102013744 A | 4/2011 |
| CN | 202218079 | 5/2012 |
| JP | 57-97357 | 6/1982 |
| JP | 8-163849 | 6/1996 |
| JP | 9-93842 | 4/1997 |
| JP | 10-271722 | 10/1998 |
| JP | H10309051 A | 11/1998 |
| JP | 11-98730 | 4/1999 |
| JP | 11-103547 | 4/1999 |
| JP | 11-113198 | 4/1999 |
| JP | 11-113199 | 4/1999 |
| JP | 11-285186 | 10/1999 |
| JP | 2002-84722 | 3/2002 |
| JP | 2006-19573 | 1/2006 |
| JP | 2009-178000 | 8/2009 |
| JP | 2010-68600 | 3/2010 |
| JP | 2011-67074 | 3/2011 |

* cited by examiner

ROTORS WITH SEGMENTED MAGNET CONFIGURATIONS AND RELATED DYNAMOELECTRIC MACHINES AND COMPRESSORS

FIELD

The present disclosure relates to rotors with segmented magnet configurations and related dynamoelectric machines and compressors.

BACKGROUND

This section provides background information related to the present disclosure which is not necessarily prior art.

Permanent magnet motors commonly include rotors having buried or embedded magnets of various shapes and/or configurations. These shapes and configurations can present challenges when magnetizing the magnets. If the magnets are not properly shaped, arranged and magnetized, the magnetic flux of the rotor and, thus, the efficiency of the rotor, may be less than optimal.

SUMMARY

This section provides a general summary of the disclosure, and is not a comprehensive disclosure of its full scope or all of its features.

According to one aspect of the present disclosure, a rotor for a dynamoelectric machine includes a rotor core having an outer periphery and at least a first set of magnets positioned within the outer periphery of the rotor core. The first set of magnets includes at least two block magnets and a magnet having an arc portion. The block magnets have a substantially parallel magnetization pattern and the magnet having an arc portion has a substantially radial magnetization pattern. The arc portion has a concave surface facing the outer periphery of the rotor core. The first set of magnets defines a pole of the rotor.

Accordingly to another aspect of the present disclosure, a rotor for a dynamoelectric machine includes a rotor core having an outer periphery and at least a first set of magnets positioned within the outer periphery of the rotor core. The first set of magnets including at least two magnets. Each magnet includes a straight portion and an arc portion. The arc portion has a concave surface facing the outer periphery of the rotor core. The first set of magnets define a pole of the rotor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
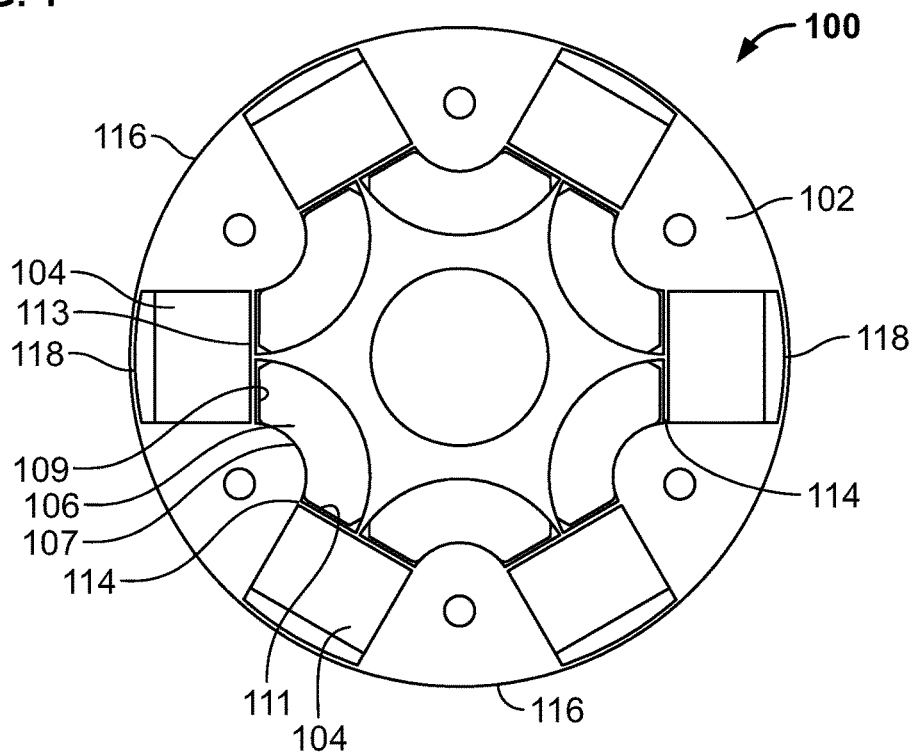
FIG. 1 is a cross sectional view of a rotor including block magnets and arc magnets according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A rotor according to one example embodiment of the present disclosure is illustrated in FIG. 1 and indicated generally by reference number 100. As shown in FIG. 1, the rotor 100 includes a rotor core 102 having an outer periphery 116 and multiple magnets positioned within the outer periphery 116 of the rotor core 102. More specifically, the rotor 100 includes six block magnets 104 and six arc magnets 106. Each arc magnet 106 includes a concave surface 107 facing the outer periphery 116 of the rotor core 102.

Figure 2:
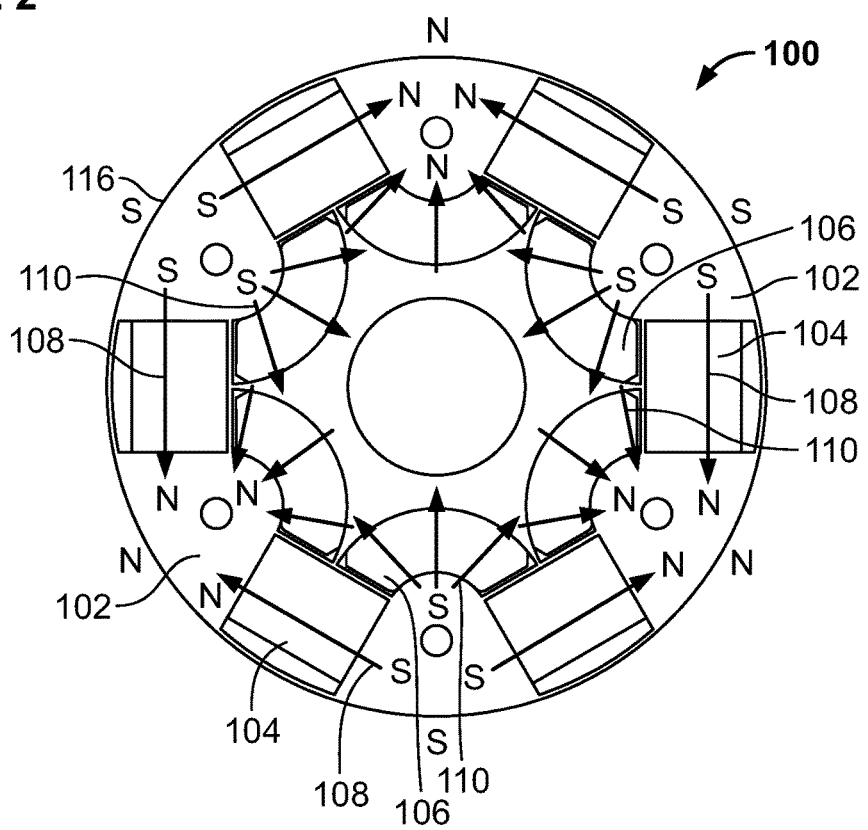
FIG. 2 is a cross sectional view of the rotor of FIG. 1 illustrating magnetization patterns of the block magnets and the arc magnets.

As shown in FIG. 2, each arc magnet 106, in combination with its two adjacent block magnets 104, defines a pole of the rotor. Further, in the example of FIG. 2, each arc magnet 106 and its two adjacent block magnets 104 have a substantially U-shaped configuration.

Because the rotor 100 of FIG. 1 includes six arc magnets 106 of alternating polarity, the rotor has a total of six poles, with the polarity of the poles alternating between north and south about the outer periphery 116, as shown in FIG. 2. Alternatively, the rotor 100 may include more or less arc magnets 106, and more or less block magnets 104. In that event, the rotor 100 will have more or less than six poles. For example, the rotor 100 (and other rotors described herein) may have four poles, twelve poles, or any other desired even number of poles.

As further shown in FIG. 2, each block magnet 104 has a substantially parallel magnetization pattern (also referred to as a "straight" magnetization pattern) as indicated by arrows 108, and each arc magnet 106 has a substantially radial magnetization pattern as indicated by arrows 110. These magnetization patterns have shown to produce an increase in magnetic flux of the rotor 100.

In the example of FIG. 1, the concave surface 107 of each arc magnet 106 extends between opposite ends 109, 111 of the magnet 106. Each opposite end 109, 111 faces one of the block magnets 104, and extends parallel to one side of a block magnet 104.

As shown in FIG. 1, the rotor core 102 may include a bridge 114 positioned between each block magnet 104 and each arc magnet 106. More specifically, the bridge 114 is positioned between an edge 113 of the each block magnet 104 and each end 109, 111 of each arc magnet 106.

The bridge 114 may be any suitable thickness including, for example, 1 mm for a 5 hp motor, 2 mm for a 10 hp motor, 5 mm for a 50 hp motor, etc. In other embodiments, the bridge thickness may be relative to an air gap between a stator and the rotor 100. For example, the bridge thickness may be about 0.5 to 3 times the size of the air gap. Thus, if the air gap is about 0.5 mm, the bridge 114 thickness may be from about 0.25 mm to about 1.5 mm.

Additionally, the rotor core 102 may include a bridge 118 positioned between each block magnet 104 and the periphery 116 of the rotor core 102. The bridge 118 may have the same or different thickness as the bridge 114 described above.

By employing the bridge 114 and/or the bridge 118, the rotor 100 may exhibit increased mechanical strength. Therefore, the rotor 100 may be operable at higher speeds including, for example, 7200 rpm, 8500 rpm, 9000 rpm, etc.

The rotor core 102 may include slots for the block magnets 104 (e.g., block magnet slots) and slots for the arc magnets 106 (e.g., arc magnet slots). These slots may be defined, at least in part, by the bridges 114. In some embodiments, the block magnet 104 and the arc magnet 106 may not completely fill their respective slots. For example, as shown in FIG. 1, the arc magnets 106 may include beveled corners. Thus, each magnet slot may include a portion occupied by a magnet (e.g., the block magnet 104 or the arc magnet 106) and a portion occupied by non-magnetic material(s) such as air, etc. In the example of FIG. 1, the non-magnetic material is positioned between the magnets 104, 106 and the outer periphery 116 of the rotor core 102.

Alternatively, the arc magnets 106 and the block magnets 104 may completely fill their respective slots so no portion of the slot includes a non-magnetic material (e.g., air, etc.).

Further, one or more block magnets 104 and/or one or more arc magnets 106 may be positioned in the same slot of the rotor core 102. That is, one or more block magnets 104 and/or one or more arc magnets 106 may be adjacent to one another with no bridge(s) therebetween.

Figure 11:
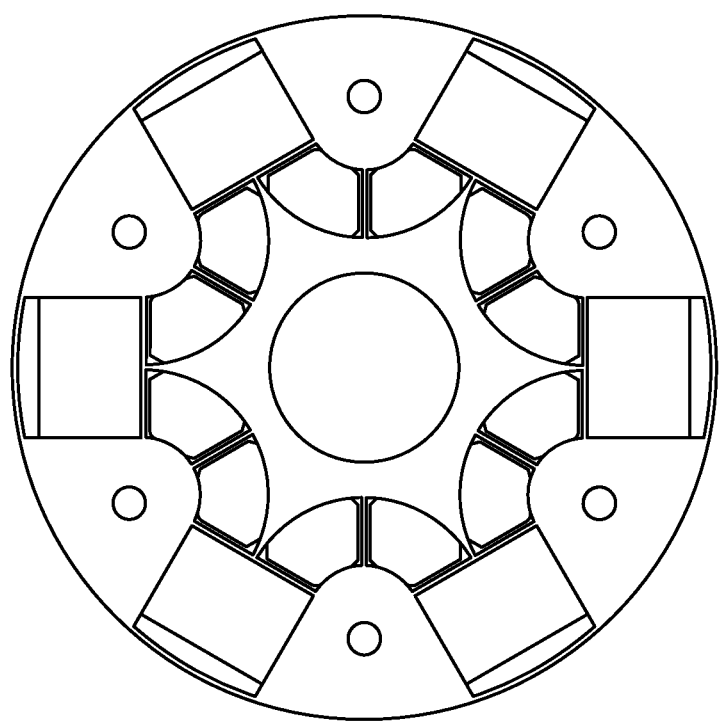
FIG. 11 is a cross sectional view of a rotor including block magnets and arc magnets according to still another example embodiment.

Various changes can be made to the magnet configuration of FIG. 1 without departing from the scope of this disclosure. For example, each arc magnet 106 of FIG. 1 may be replaced by two arc magnets. Thus, two arc magnets, in combination with two adjacent block magnets, may define a pole of the rotor. This configuration is shown in FIG. 11.

Figure 3:
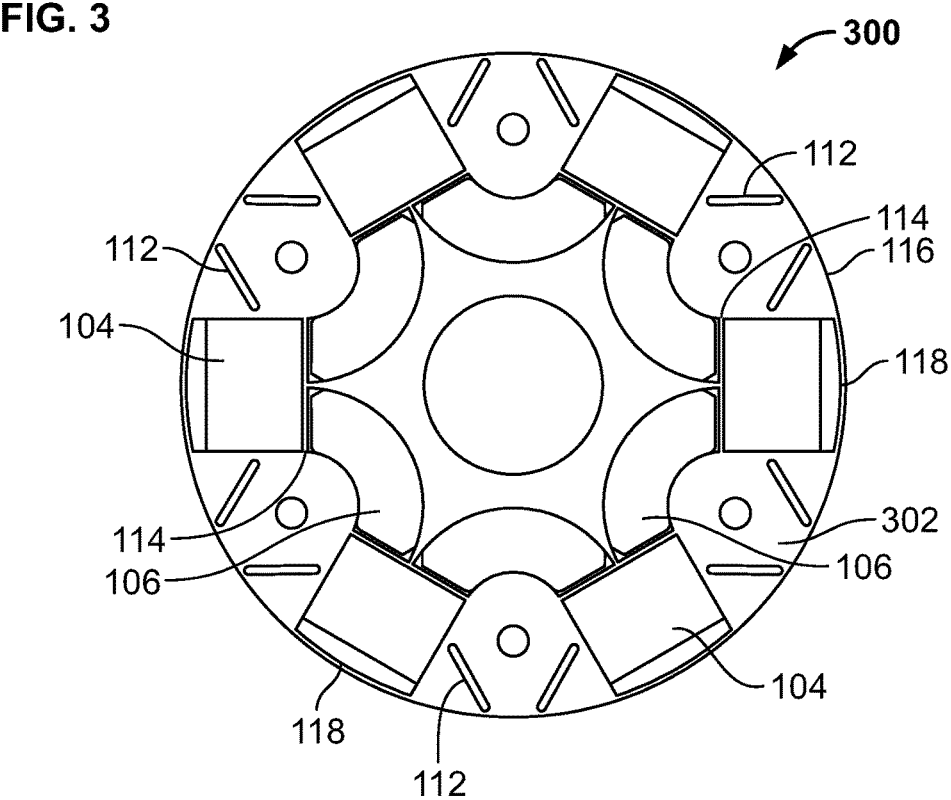
FIG. 3 is a cross sectional view of a rotor similar to the rotor of FIG. 1, but having non-magnetic slits according to another example embodiment.

FIG. 3 illustrates a rotor 300 similar to the rotor 100 of FIG. 1, but with non-magnetic slits 112 extending through the rotor core 302. The non-magnetic slits 112 may be occupied by non-magnetic material(s) such as air, etc. The rotor 300 may include any suitable number of slits 112.

Thus, although in the example of FIG. 3, only two slits 112 per pole are shown, more or less slits per pole and/or other slits may be employed.

Additionally, although all the slits 112 are elongated and have the same size and shape, any suitable size and/or shape may be employed. For example, one or more of the slits 112 may have a different size than one or more other slits 112, and/or may be tear-shaped, S-shaped, etc.

As shown in FIG. 3, the slits 112 may be positioned between each arc magnet 106 and the outer periphery 116 of the rotor core 302. Alternatively, slits 112 may be positioned in other suitable locations in the rotor core 302.

Additionally, as shown in FIG. 3, the slits 112 are angled relative to the radial axis of the rotor 300. Alternatively, some or all of the slits 112 may be substantially parallel to the radial axis of the rotor 300. In some embodiments, the slits 112 are neither parallel nor perpendicular to the radial axis of the rotor 300 or to the block magnets 104. As shown in FIG. 3, an adjacent pair of slits 112 may be positioned between each arc magnet 106 and the outer periphery 116 of the rotor core 302, and angled toward one another from an inside out perspective.

By employing the slits 112, iron loss and inductance of a motor including the rotor 100 may be reduced. This is beneficial because lower iron losses improve the motor's efficiency. Additionally, because inductance consumes voltage, a lower inductance consumes less voltage. If less voltage is consumed, the torque of the motor may be increased and in some cases maximized.

Figure 4:
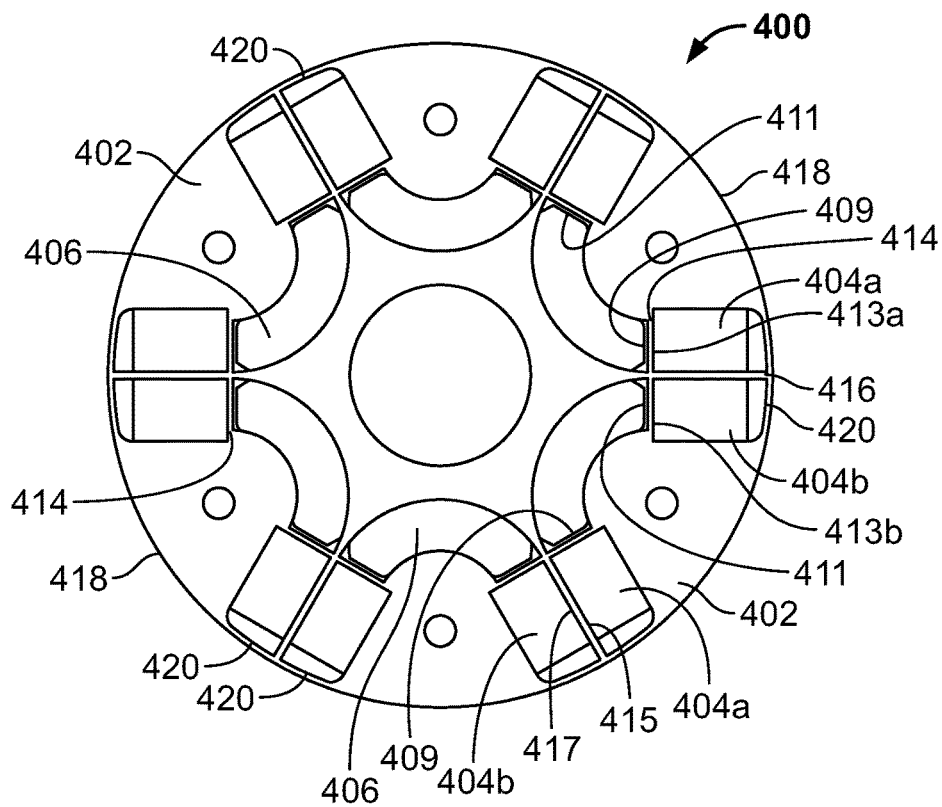
FIG. 4 is a cross sectional view of a rotor including block magnets and arc magnets according to another example embodiment.

FIG. 4 illustrates a rotor 400 including a rotor core 402 having an outer periphery 418 and multiple magnets positioned within the outer periphery 418 of the rotor core 402. More specifically, the rotor 400 includes six block magnets 404a, six block magnets 404b and six arc magnets 406. The rotor 400 includes similar advantages as the rotor 100 described above with reference to FIGS. 1-3.

As shown in FIG. 4, the rotor core 402 includes a plurality of bridges 414, 420 and a plurality of radially extending webs 416. Each bridge 414 is positioned between an edge 413a, 413b of each block magnet 404a, 404b and each end 409, 411 of each arc magnet 414. Each bridge 420 is positioned between each block magnet 404a, 404b and the outer periphery 418 of the rotor core 402. Each web 416 is positioned between one of the block magnets 404a and its adjacent block magnet 404b (i.e., between edges 415, 417 of the block magnets 404a, 404b, respectively). The webs 416 and the bridges 414, 420 may increase the mechanical strength of the rotor 400 as described above.

Figure 5:
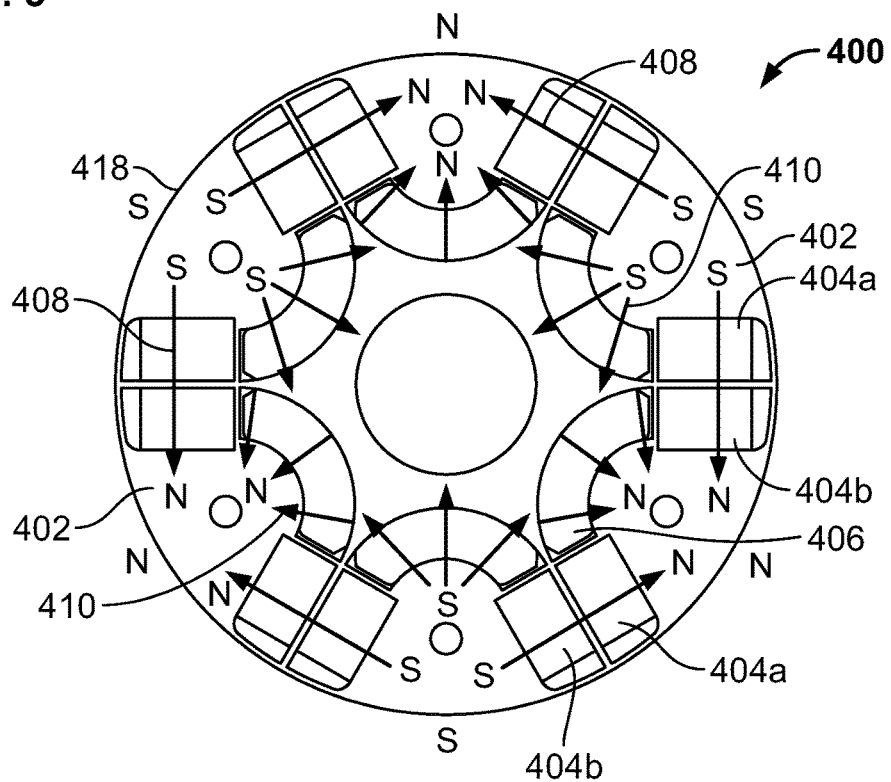
FIG. 5 is a cross sectional view of the rotor of FIG. 4 illustrating magnetization patterns of the block magnets and the arc magnets.

As shown in FIG. 5, one block magnet 404a, one block magnet 404b and one arc magnet 416 therebetween (together having a substantially U-shaped configuration) define alternating poles of the rotor 400 along the outer periphery 418 of the rotor core 402. In the particular example of FIG. 5, the rotor 400 includes six poles. Alternatively, the rotor 400 may include more or less poles (and thus more or less block and arc magnets).

The block magnets 404a, 404b and the arc magnets 406 include similar magnetization patterns as described above with reference to FIGS. 1-3. The parallel magnetization pattern of the block magnets 404a, 404b (indicated by arrows 408) and the substantially radial magnetization pattern of the arc magnets 406 (indicated by arrows 410) are shown in FIG. 5.

Figure 6:
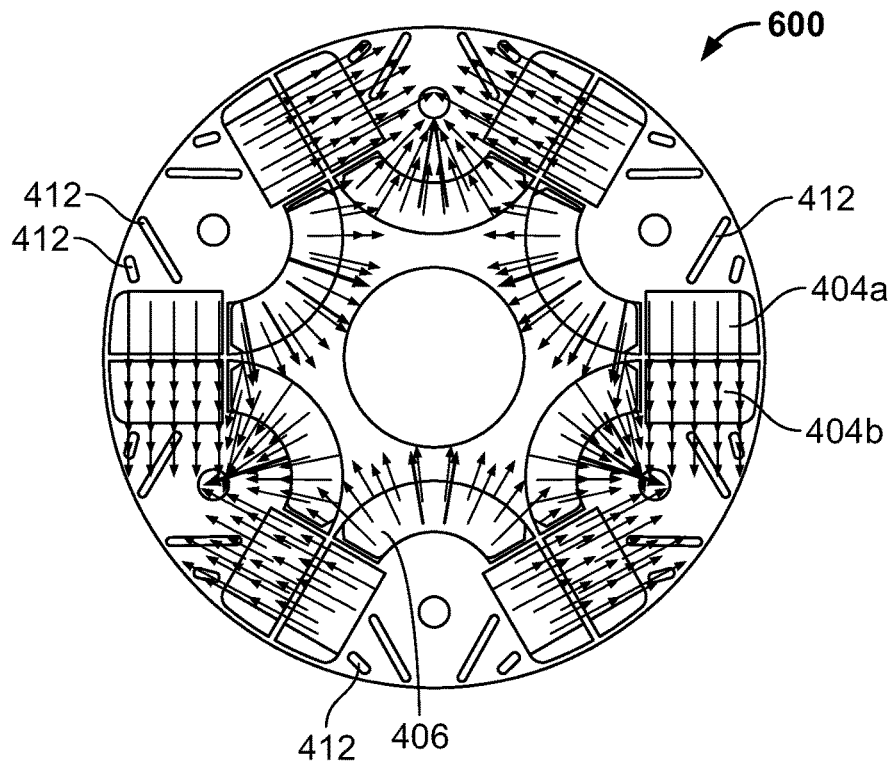
FIG. 6 is a cross sectional view of the rotor of FIG. 4 illustrating a finite element analysis (FEA) simulation of the magnetization patterns shown in FIG. 5.

FIG. 6 illustrates a finite element analysis (FEA) simulation of the magnetization patterns of the block magnets 404a, 404b and the arc magnets 406 of a rotor 600 similar to the rotor 400 of FIG. 4, but with non-magnetic slits 412 having various sizes and angles. As shown in FIG. 6, the block magnets 404a, 404b have parallel magnetization patterns and the arc magnets 406 have substantially radial magnetization patterns.

Figure 7:
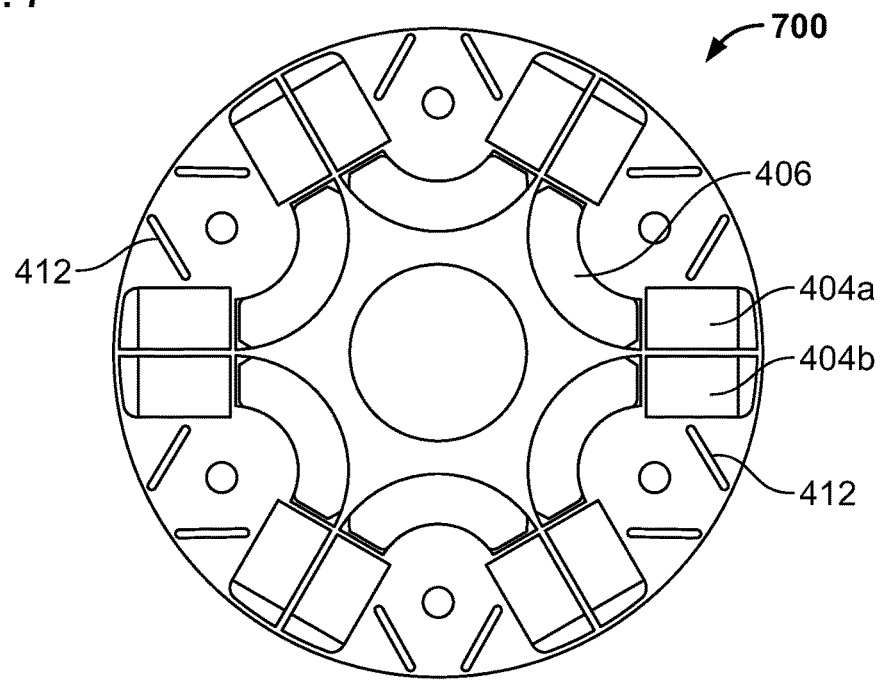
FIG. 7 is a cross sectional view of a rotor similar to the rotor of FIG. 4, but having non-magnetic slits according to still another example embodiment.

FIG. 7 illustrates another rotor 700 similar to the rotor 400 of FIG. 4, but with non-magnetic slits 712 similar to the non-magnetic slits 112 of FIG. 3.

In some embodiments, two block magnets and two arc magnets may together define a pole of the rotor. One example of this configuration is shown in FIG. 8.

Figure 8:
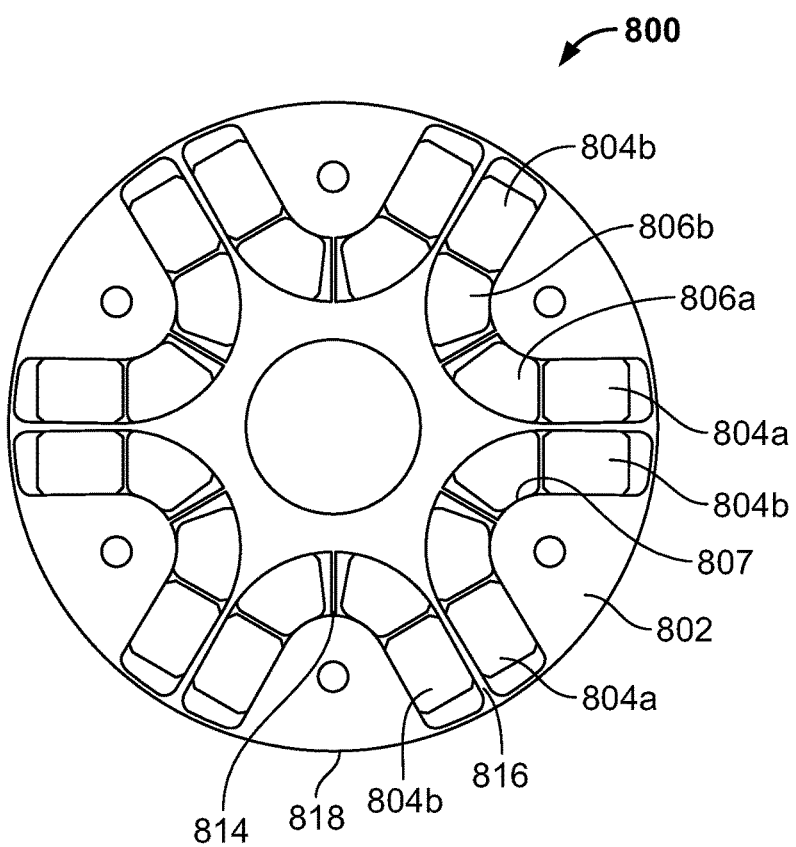
FIG. 8 is a cross sectional view of a rotor including block magnets and arc magnets according to yet another example embodiment.

As shown in FIG. 8, a rotor 800 includes a rotor core 802 having block magnets 804a, 804b and arc magnets 806a, 806b positioned within an outer periphery 818 of the rotor core 802. Each set of two block magnets 804a, 804b and two arc magnets 806a, 806b together define a pole of the rotor 800.

Similar to arc magnets described above, the arc magnets 806a, 806b each include a concave surface 807 facing the outer periphery 818 of the rotor core 802. Further, each block magnet 804a, 804b has a substantially parallel magnetization pattern and each arc magnet 806a, 806b has a substantially radial magnetization pattern (similar to the embodiment of FIG. 5).

In the example of FIG. 8, the rotor core 802 includes bridges 814 and radially extending webs 816. The bridges 814 are positioned between each adjacent arc magnet 806a, 806b while the webs 816 are positioned between each adjacent block magnet 804a, 804b. The webs 816 and the bridges 814 may increase the mechanical strength of the rotor 800 as noted above.

In other embodiments, only two magnets may be used to define each pole of the rotor. An example of this configuration is shown in FIG. 9.

Figure 9:
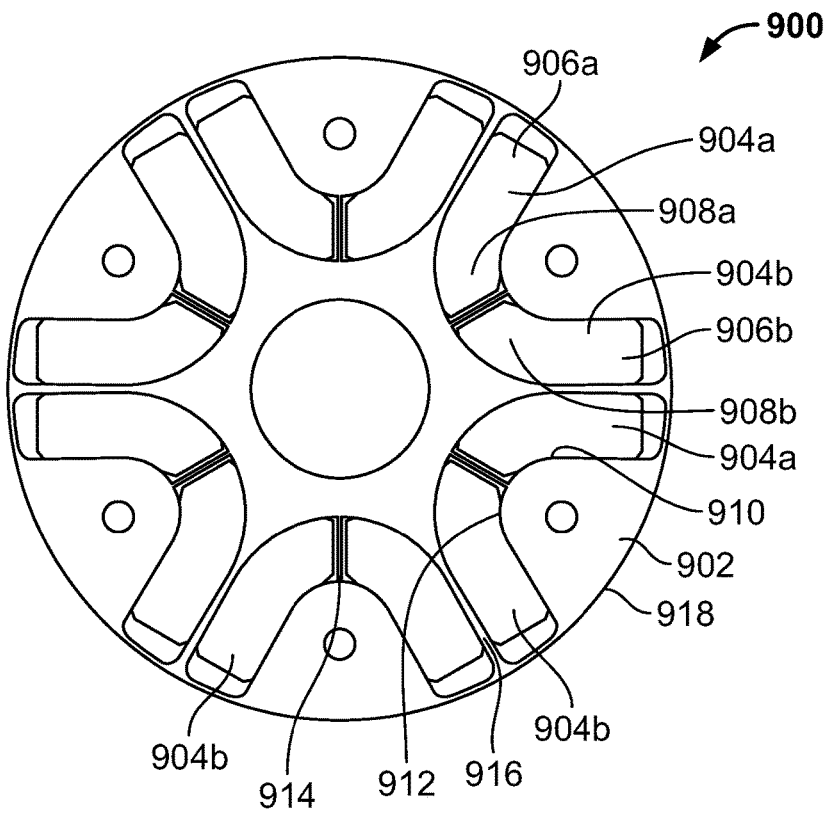
FIG. 9 is a cross sectional view of a rotor including magnets having straight portions and arc portions according to another example embodiment.

As shown in FIG. 9, a rotor 900 includes a rotor core 902 having an outer periphery 918 and multiple magnets positioned within the outer periphery 918. More specifically, the rotor 900 includes twelve total magnets (i.e., six magnets 904a and six magnets 904b).

As shown in the example of FIG. 9, each magnet 904a, 904b includes a straight portion 906a, 906b and an arc portion 908a, 908b, respectively. Each arc portion 908a, 908b has a concave surface 910, 912, respectively, facing the outer periphery 918 of the rotor core 902.

The rotor 900 includes six alternating poles, each defined by a pair of magnets 904a, 904b arranged in a U-shape. Alternatively, the rotor 900 may include more or less poles (and thus more or less magnets).

As shown in FIG. 9, the rotor core 902 may include bridges 914 and radially extending webs 916. Each web 916 is positioned between the straight portions 906a, 906b of adjacent magnets 904a, 904b, while each bridge 914 is positioned between arc portions 908a, 908b of adjacent magnets 904a, 904b. The webs 916 and the bridges 914 may increase the mechanical strength of the rotor 800.

Although not shown in FIG. 9, the magnets 904a, 904b may have substantially parallel and/or radial magnetization patterns (e.g., as described above with reference to FIG. 5).

Figure 10:
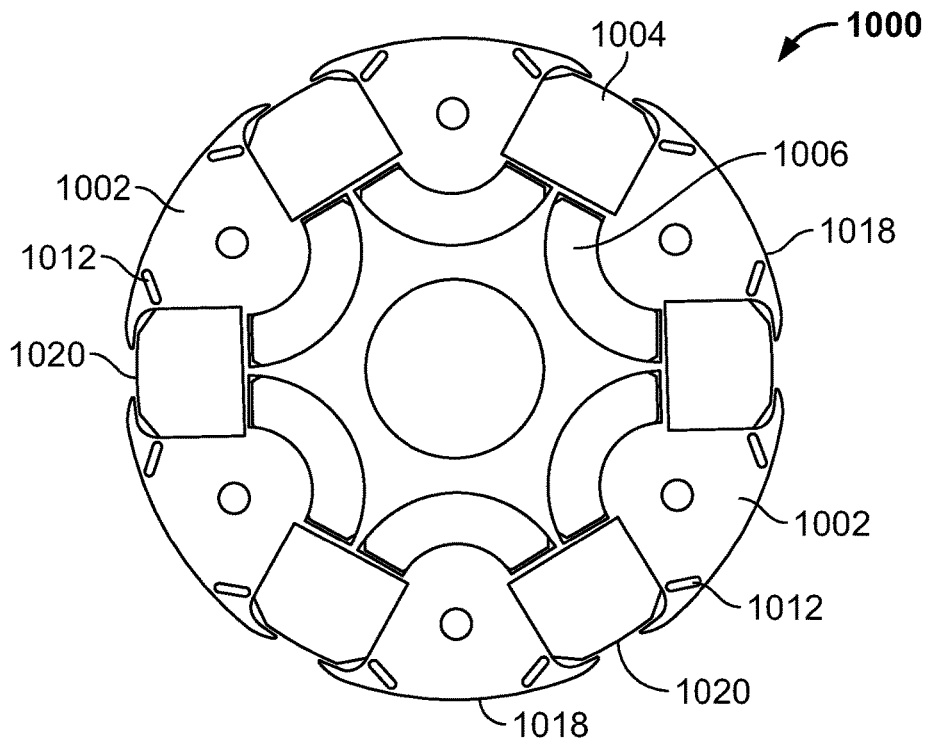
FIG. 10 is a cross sectional view of a rotor including block magnets and arc magnets according to yet another example embodiment.

FIG. 10 illustrates a rotor 1000 including a rotor core 1002 having an outer periphery 1018. The rotor core 1002 includes block magnets 1004 and arc magnets 1006 positioned within the outer periphery 1018 of the rotor core 1002. As shown in FIG. 10, the block magnets 1004 have beveled corners, and a portion (e.g., edge 1020) of each block magnet 1004 is exposed along the outer periphery 1018 of the rotor core 1002. Block magnets having beveled corners and/or exposed portions may also be employed in other embodiments described herein.

The rotor 1000 includes slits 1012 extending through the rotor core 1002. Although the slits 1012 are different in size and orientation than the slits 112 of FIG. 3, the slits 1012 may provide the same advantages as the slits 112 of FIG. 3.

Although not shown in FIG. 10, the block magnets 1004 and the arc magnets 1006 include similar magnetization patterns (i.e., substantially parallel and radial, respectively) as described above with reference to FIG. 2.

Figure 12:
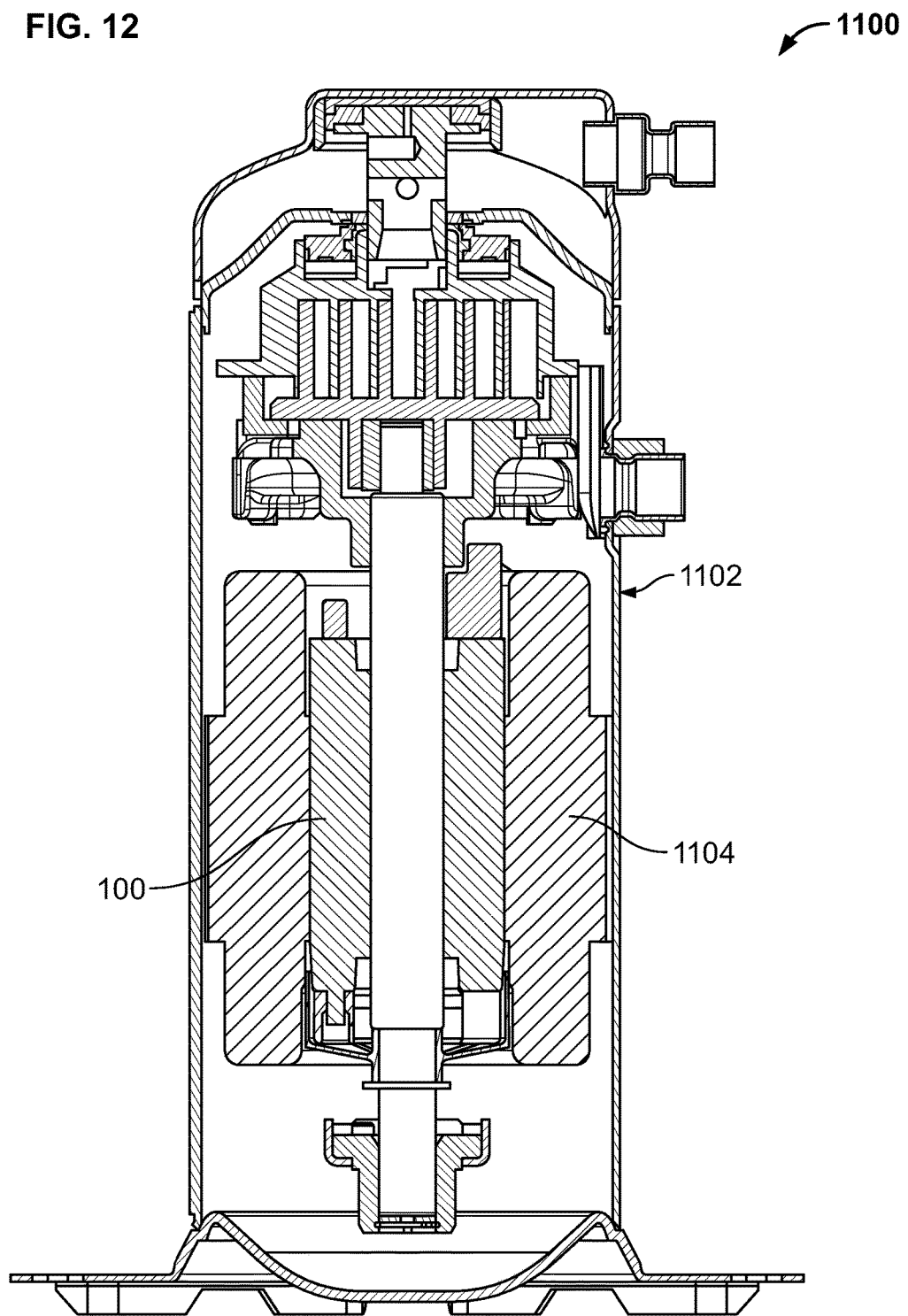
FIG. 12 is a cross sectional view of a compressor including a dynamoelectric machine according to yet another example embodiment.

FIG. 12 illustrates a compressor 1100 including a dynamoelectric machine 1102. The dynamoelectric machine 1102 includes a stator 1104 and the rotor 100 of FIG. 1 positioned within the stator 1104. Alternatively, any other rotor according to the present disclosure may be employed in the compressor 1100 of FIG. 12. Further, while the compressor 1100 of FIG. 12 is a scroll compressor, other types of compressors (including, e.g., piston compressors, screw compressors, etc.) may be employed.

Although not shown in FIGS. 1-11, each arc magnet could be divided into two or more concentric arc magnets (i.e., with the concave surface of one arc magnet facing the convex surface of an adjacent arc magnet). This configuration would allow a bridge to be formed between adjacent arc magnets, which may increase the mechanical strength of the rotor.

Preferably, the various magnets described herein are pre-magnetized magnets. That is, each magnet is magnetized before the magnet is positioned within a rotor. Alternatively, the magnets may be magnetized after they are positioned in a rotor (e.g., by a magnetizer, by energizing stator windings, etc.).

Each magnet described herein may be formed of any suitable magnetic material(s) including, for example, rare earth materials (e.g., neodymium, etc.), ferrite, etc. Further, each rotor described herein may include magnets all formed of the same magnetic material(s) and having the same or different grades. For example, one or more block magnets may include a first grade of a magnetic material while one or more arc magnets may include a second grade (different than the first grade) of the same magnetic material. Alternatively, each rotor described herein may include a plurality of different magnet types (i.e., comprised or different materials and/or different grades). In some embodiments, a given rotor may employ only rare earth magnets (neodymium, etc.), only ferrite magnets, etc. Thus, the magnets may have different coercivities (i.e., the resistance of a material to becoming demagnetized) and/or BR (sometimes referred to as residual induction or residual flux density). In some preferred embodiments, the block magnets include a material having a higher coercivity and a lower BR, while the arc magnets include a material having a lower coercivity and a higher BR (relative to the block magnets).

Further, each magnet described herein may have any suitable thickness, which may be the same or different thickness than another magnet. For example, in FIGS. 1-7, the block magnets are thicker than the arc magnets, while in FIGS. 8 and 9, all magnets have the same thickness.

In some embodiments, the block magnets have a thickness greater than the thickness of the arc magnets. This configuration may alleviate demagnetizing concerns. Further, decreasing the thickness of an arc magnet (or an arc portion of a magnet) will increase the area of its concave surface. Because a magnet surface generally includes a constant magnetic flux density, the increased surface area of the arc magnet (and thus increased magnetic flux density) may produce more magnetic flux in the rotor.

Although the embodiments described herein refer to arc magnets, any magnet having an arc portion may be employed, including for example a C-shaped magnet, a U-shaped magnet, etc.

Testing, however, has shown that the rotors 100, 400, 800 including the block magnets 104, 404a, 404b, 804 and the arc magnets 106, 406, 806 produce a higher magnetic flux compared to other rotors employing different magnet configurations (e.g., C-shaped magnets and/or U-shaped magnets). Specifically, testing has shown that the rotors (e.g., the rotors 100, 400) having the block magnets and the arc magnets produce a magnetic flux of about 1.419 mWb, while a magnetic flux of a rotor having a C-shaped magnet configuration was about 1.262 mWb. Thus, the magnetic flux of the rotors described herein may be 12-15% higher than the magnetic flux of rotors including C-shaped magnet configurations.

Additionally, the rotor 1000 including the block magnets 1004 and the arc magnets 1006 produces a magnetic flux about 10% higher than the magnetic flux produced in the rotors 100, 400.

In addition, testing has shown that the efficiency of the rotors (e.g., the rotors 100, 400, 800) including the block magnets and the arc magnets is higher than the efficiency of rotors including a C-shaped magnet configuration. Specifically, the efficiency of the rotors including the block magnets and the arc magnets is about 93.6%, while the efficiency of a rotor having a C-shaped magnet configuration was about 92.8%.

Further, by increasing magnetic flux of the rotor as explained above, the drive efficiency of the rotor may be increased. That is, by increasing magnetic flux, the inductance in the rotor is reduced. This reduces the amount of current consumed by the inductance. Thus, less current may be used to produce the same amount of torque. This in turn increases the drive efficiency of the rotor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rotor for a dynamoelectric machine, the rotor comprising:
   a rotor core having an outer periphery; and
   at least a first set of magnets positioned within the outer periphery of the rotor core,
   the first set of magnets including at least a first block magnet, a second block magnet, and a magnet having an arc portion, the first and second block magnets each having a substantially parallel magnetization pattern and the magnet having the arc portion having a substantially radial magnetization pattern, the arc portion having a concave surface facing the outer periphery of the rotor core, the first set of magnets defining a pole of the rotor, the first and second block magnets each including opposite ends, the magnet having the arc portion including opposite ends, one end of the first block magnet having a magnetizing direction that is substantially parallel to a magnetizing direction of one end of the magnet having the arc portion, one end of the second block magnet having a magnetizing direction that is substantially parallel to a magnetizing direction of the other end of the magnet having the arc portion.

2. The rotor of claim 1 further comprising a second set of magnets positioned within the outer periphery of the rotor core, the second set of magnets including at least a block magnet having a substantially parallel magnetization pattern and a magnet having an arc portion having a substantially radial magnetization pattern, the magnet having the arc portion of the second set of magnets having opposite first and second ends, the first end facing one of the first and second block magnets of the first set of magnets and the second end facing the block magnet of the second set of magnets.

3. The rotor of claim 1 wherein the rotor includes a plurality of sets of magnets, the plurality of sets of magnets including the first set of magnets, each set in the plurality of sets of magnets having substantially the same configuration as the first set of magnets, the plurality of sets of magnets defining alternating poles of the rotor along the outer periphery.

4. The rotor of claim 3 wherein the rotor core includes a plurality of radially extending webs, and each radially extending web is positioned between one of the block magnets of one of the plurality of sets of magnets and one of the block magnets of an adjacent one of the plurality of sets of magnets.

5. The rotor of claim 1 wherein the magnet having the arc portion is a first magnet having an arc portion, the first set of magnets further including a second magnet having an arc portion with a substantially radial magnetization pattern, the arc portion of the second magnet including a concave surface facing the outer periphery of the rotor core.

6. The rotor of claim 1 wherein portions of the first and second block magnets are exposed along the outer periphery of the rotor core.

7. The rotor of claim 1 wherein each magnet of the first set of magnets comprises the same magnetic material.

8. The rotor of claim 7 wherein the first and second block magnets of the first set of magnets comprise a first grade of said magnetic material, and the magnet having the arc portion of the first set of magnets comprises a second grade of said magnetic material, the first grade being different than the second grade.

9. The rotor of claim 7 wherein the magnetic material is ferrite.

10. The rotor of claim 1 wherein the rotor core includes a plurality of angled slits extending through the rotor core, at least two of the plurality of angled slits positioned between the magnet having the arc portion and the outer periphery of the rotor core.

11. The rotor of claim 1 wherein the rotor core includes a plurality of block magnet slots, each block magnet slot including a first portion occupied by one of the first and second block magnets and a second portion occupied by a non-magnetic material, and wherein the second portion of each block magnet slot is positioned between the first portion of such block magnet slot and the outer periphery of the rotor core.

12. The rotor of claim 1 wherein the first and second block magnets are thicker than the magnet having the arc portion.

13. The rotor of claim 1 wherein the magnets are pre-magnetized magnets.

14. The rotor of claim 1 wherein the concave surface of the magnet having the arc portion extends between the opposite ends of the magnet, and wherein each opposite end faces one of the first and second block magnets.

15. The rotor of claim 14 wherein the rotor core includes at least one bridge positioned between one of the first and second block magnets and one of the opposite ends of the magnet having the arc portion.

16. The rotor of claim 1 wherein the magnet having the arc portion is an arc magnet.

17. A rotor for a dynamoelectric machine, the rotor comprising:
a rotor core having an outer periphery, the rotor core defining a plurality of magnet slots; and
at least a first set of magnets positioned within the outer periphery of the rotor core,
the first set of magnets including at least two magnets, each magnet including a straight portion and an arc portion, the arc portion having a concave surface facing the outer periphery of the rotor core, the first set of magnets defining a pole of the rotor, at least one of the magnet slots including a portion occupied by at least one of the two magnets and another portion occupied by non-magnetic material.

18. The rotor of claim 17 wherein the rotor includes a plurality of sets of magnets, the plurality of sets of magnets including the first set of magnets, each set in the plurality of sets of magnets having substantially the same configuration as the first set of magnets, the plurality of sets of magnets defining alternating poles of the rotor along the outer periphery.

19. The rotor of claim 18 wherein the rotor core includes a plurality of radially extending webs, and each radially extending web is positioned between one straight portion of one of the plurality of sets of magnets and one straight portion of an adjacent one of the plurality of sets of magnets.

20. The rotor of claim 17 wherein the rotor core includes a plurality of bridges, and each bridge is positioned between the arc portion of one magnet and the arc portion of another adjacent magnet.

21. The rotor of claim 17 wherein the magnets are premagnetized magnets.

22. A dynamoelectric machine comprising the rotor of claim 17.

23. A compressor comprising the dynamoelectric machine of claim 22.

* * * * *